（12) United States Patent
Geoffroy et al.

(10) Patent No.: US 11,456,558 B2
(45) Date of Patent: Sep. 27, 2022

(54) PASS-THROUGH CONNECTOR FOR A BATTERY PACK, BATTERY PACK, AND METHOD FOR INTRODUCING AT LEAST ONE GAS IN A HERMETICALLY SEALABLE CASING FOR A BATTERY PACK

(71) Applicant: BLUE SOLUTIONS CANADA INC., Boucherville (CA)

(72) Inventors: Sebastien Geoffroy, Montreal (CA); Ronan Lacour, Montreal (CA)

(73) Assignee: BLUE SOLUTIONS CANADA INC., Boucherville (CA)

( * ) Notice: Subject to any disclaimer, the term of this patent is extended or adjusted under 35 U.S.C. 154(b) by 0 days.

(21) Appl. No.: 17/236,342

(22) Filed: Apr. 21, 2021

(65) Prior Publication Data

US 2021/0336375 A1 Oct. 28, 2021

Related U.S. Application Data

(60) Provisional application No. 63/013,780, filed on Apr. 22, 2020.

(51) Int. Cl.
*H01R 13/74* (2006.01)
*H01R 13/52* (2006.01)
(Continued)

(52) U.S. Cl.
CPC ...... *H01R 13/5202* (2013.01); *H01M 50/172* (2021.01); *H01M 50/186* (2021.01);
(Continued)

(58) Field of Classification Search
CPC ............ H01R 13/5202; H01R 12/7011; H01R 13/04; H01R 13/405; H01R 13/512; H01R 13/74; H01M 50/172; H01M 50/186
See application file for complete search history.

(56) References Cited

U.S. PATENT DOCUMENTS 5,277,610 A * 1/1994 Krehbiel ................ H01R 13/74
439/271
5,669,763 A * 9/1997 Pryce ..................... F02M 37/10
439/942
(Continued)

FOREIGN PATENT DOCUMENTS

FR 3085556 A1 3/2020
KR 10-1273193 B1 6/2013

OTHER PUBLICATIONS

International Search Report and Written Opinion issued in co-pending application No. PCT/CA2021/050546 dated Jul. 21, 2021.

*Primary Examiner* — Tho D Ta
(74) *Attorney, Agent, or Firm* — BCF LLP

(57) ABSTRACT

A pass-through connector for a battery pack having a hermetic casing is disclosed. The pass-through connector has a body including: a hermetic electrical, a first body portion defining a first connector portion, a second body portion opposite the first body portion, and a flange connected to and projecting radially from the second body portion. The pass-through connector also has a second connector portion selectively connected to the first connector portion, and a gasket abutting an engagement surface of the flange and adapted for providing a hermetic seal between the pass-through connector and the casing. At least one of the first body portion and the second connector portion defines at least one recess for permitting gas exchange in and out of the casing. A battery pack having the pass-through connector, and a method for introducing at least one gas in a hermetically sealable casing for a battery pack are also disclosed.

20 Claims, 14 Drawing Sheets

(51) Int. Cl.
*H01R 13/512* (2006.01)
*H01M 50/186* (2021.01)
*H01R 13/405* (2006.01)
*H01R 12/70* (2011.01)
*H01M 50/172* (2021.01)
*H01R 13/04* (2006.01)

(52) U.S. Cl.
CPC ......... *H01R 12/7011* (2013.01); *H01R 13/04* (2013.01); *H01R 13/405* (2013.01); *H01R 13/512* (2013.01); *H01R 13/74* (2013.01)

(56) References Cited

U.S. PATENT DOCUMENTS

| | | | |
|---|---|---|---|
| 6,685,496 B2 * | 2/2004 | Ookura | H01R 13/74 439/372 |
| 2009/0104521 A1 | 4/2009 | Yasuda et al. | |
| 2010/0190375 A1 * | 7/2010 | Rohde | H01R 13/5202 439/549 |
| 2012/0114998 A1 | 5/2012 | Hwang | |
| 2015/0011108 A1 * | 1/2015 | Vanslambrouck | H01R 13/6272 439/271 |
| 2018/0190965 A1 | 7/2018 | Lee et al. | |
| 2020/0274304 A1 * | 8/2020 | Kosaka | B60L 53/16 |

\* cited by examiner

PASS-THROUGH CONNECTOR FOR A BATTERY PACK, BATTERY PACK, AND METHOD FOR INTRODUCING AT LEAST ONE GAS IN A HERMETICALLY SEALABLE CASING FOR A BATTERY PACK

CROSS-REFERENCE TO RELATED APPLICATION

The present application claims priority to U.S. Provisional Patent Application Ser. No. 63/013,780, filed Apr. 22, 2020, entitled "Pass-Through Connector for a Battery Pack, Battery Pack, and Method for Introducing at Least One Gas in a Hermetically Sealable Casing for a Battery Pack", which is incorporated by reference herein in its entirety.

FIELD OF TECHNOLOGY

The present technology relates to pass-through connectors for battery packs, to battery packs having a pass-through connector, and to a method for introducing at least one gas in a hermetically sealable casing for a battery pack using a pass-through connector.

BACKGROUND

Battery packs, such as those used for electric vehicles, include multiple high voltage batteries typically connected in series. The total voltage of a battery pack in an electric vehicle can reach up to 400 volts when all batteries are connected together.

In some cases, the batteries are received in a casing. The casing is hermetically sealed and filled with an inert gas mixture to prevent oxidation of the batteries and/or the components contained in the casing. Removing and introducing gases from and into the casing at an adequate flow rate, and subsequently hermetically sealing the introduced gases within the casing can be difficult.

Also, the batteries need to be electrically connected to components located outside the casing while maintaining the hermetic seal of the casing. In this regard, pass-through connectors have been developed to connect the electric and electronic components located inside the casing with other electric and electronic components located outside the casing. However, such pass-through connectors tend to have complex features which increase their manufacturing costs, the complexity of assembly, and likelihood of gas leaking out of the casing via the pass-through connectors.

Therefore, there is a desire for pass-through connectors that could mitigate these issues.

SUMMARY

It is an object of the present technology to ameliorate at least some of the inconveniences present in the prior art.

According to one aspect of the present technology, there is provided a pass-through connector for a battery pack that has a hermetic casing. The pass-through connector has a body, a second connector portion and a gasket. The body has a hermetic electrical, a first body portion, a second body portion and a flange. The hermetic electrical connector has first and second sides. The first body portion defines a first connector portion that is on a same side as the first side of the hermetic electrical connector. The second body portion is opposite to the first body portion, and is on a same side as the second side of the hermetic electrical connector. The flange is connected to the second body portion and projects radially away from the second body portion. The flange has an engagement surface. The second connector portion can selectively be connected to the body via the first connector portion. At least one of the first body portion and the second connector portion defines at least one recess for permitting gas exchange in and out of the casing. The gasket abuts against the engagement surface of the flange. The gasket is adapted for providing a hermetic seal between the pass-through connector and the casing by connecting the second connector portion to the first connector portion to resiliently compress the gasket against the casing with the flange. The gasket is on a same side of the flange as the first body portion.

In some embodiments, the first connector portion has an external thread, and the second connector portion has an internal thread complementary with the external thread. The gasket abuts the engagement surface of the flange and hermetically seals the pass-through connector to the casing when the second connector portion is screwed down to the first connector portion and the gasket is resiliently compressed against the casing by the flange.

In some embodiments, the hermetic electrical connector has a partition wall connected to the body. The partition wall defines a plurality of through holes. The partition wall has a first side that is on a same side as the first body portion, and a second side that is on a same side as the second body portion. The hermetic electrical connector also has a plurality of connector pins that pass through the plurality of through holes, and project away from the first and second sides of the partition wall.

In some embodiments, the first body portion has at least one first side wall that projects from the partition wall. The at least one first side wall defines a first cavity disposed on the first side of the partition wall. The plurality of connector pins extends in the first cavity.

In some embodiments, the at least one first side wall has a first height. Each connector pin of the plurality of connector pins has a first pin height defined between a first free end of the connector pin disposed in the first cavity and on the first side of the partition wall. The first height is greater than the first pin height.

In some embodiments, the second body portion has at least one second side wall that projects from the partition wall. The at least one second side wall defines a second cavity disposed on the second side of the partition wall. The plurality of connector pins extends in the second cavity.

In some embodiments, the at least one second side wall has a second height. Each connector pin of the plurality of connector pins has a second pin height defined between a second free end opposite the first free end. The second free end is disposed in the second cavity and on the second side of the partition wall. The second height is shorter than the second pin height.

In some embodiments, the second cavity is at least partially filled with an adhesive for bonding the plurality of connector pins to the body and for hermetically sealing spaces between the plurality of connector pins and the plurality of through holes.

In some embodiments, the body, the second connector portion and the gasket are made of electrically insulating materials.

In some embodiments, the body is formed of injection molded polymeric material, and the flange is free of flash line on the engagement surface.

In some embodiments, the gasket is a X-ring seal.

In some embodiments, when the second connector portion is connected to the first connector portion and the gasket hermetically seals the pass-through connector to the casing, the gasket is resiliently compressed by 10 to 25%.

In some embodiments, the second body portion defines a radially extending shoulder that has a shoulder surface for abutting the casing. The flange extends radially away from the shoulder. The axial distance between the engagement surface of the flange and the shoulder surface is more than 75% of an uncompressed axial dimension of the gasket.

In some embodiments, the axial distance between the engagement surface of the flange and the shoulder surface is more than or equal to 83% of the uncompressed axial dimension of the gasket.

In some embodiments, the first body portion has a radially extending polygonal flange that is adapted for insertion in an aperture that is defined in the casing of the battery pack adapted to receive the pass-through connector.

In some embodiments, the polygonal flange has an octagonal shape.

In some embodiments, the first body portion defines at least one bore hole. The bore hole is adapted to receive at least one threaded fastener.

In some embodiments, the first body portion has at least one guiding projection that extends away from the partition wall. The at least one guiding projection is adapted for positioning an electronic circuit board for operative connection with the plurality of connector pins. The electronic circuit board is adapted for connection by the at least one threaded fastener to the first body portion via the at least one bore hole.

In some embodiments, the at least one of the first body portion and the second connector portion that defines the at least one recess is the first body portion.

In some embodiments, the at least one recess is defined at least partially by a radially outer surface of the first body portion.

In some embodiments, the at least one recess includes a first recess and a second recess.

In another aspect of the present technology, there is provided a battery pack having a casing, at least one cell, the pass-through connector according to the above aspect or according to the above aspect and one or more of the above embodiments, and at least one cable. The at least one cell has an anode and a cathode. The at least one cell is disposed inside the casing. The pass-through connector is connected to and extends through the casing. The at least one cable is electrically connected between the at least one cell and the pass-through connector inside the casing.

In another aspect of the present technology, a method for introducing at least one gas in a hermetically sealable casing for a battery pack is provided. The method includes loosening a pass-through connector that is fastened to the casing and extends through the casing. The pass-through connector has a gasket disposed between a flange of the pass-through connector and an inner surface of the casing. The gasket surrounds an aperture of the casing through which the pass-through connector is inserted. Loosening the pass-through connector permits the passage of gas between the gasket and the inner surface of the casing. After loosening the pass-through connector, the method also includes removing gas contained in the casing via a recess defined by the pass-through connector and disposed externally of the casing. The gas being removed flows sequentially from the casing, past the gasket and through the recess. After removing the gas contained in the casing, the method also includes introducing the at least one gas in the casing via the recess. The at least one gas being introduced flows sequentially through the recess, past the gasket and into the casing. After introducing the at least one gas, the method also includes tightening the pass-though connector to resiliently compress the gasket between the flange and the inner surface of the casing to form a hermetic seal preventing the passage of gas through the aperture in the casing and through the recess in the pass-through connector.

In some embodiments, the at least one gas is an inert gas.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying figures and the appended claims.

BRIEF DESCRIPTION OF THE FIGURES

For a better understanding of the present technology, as well as other aspects and further features thereof, reference is made to the following description which is to be used in conjunction with the accompanying figures, where.

DETAILED DESCRIPTION

Figure 1:
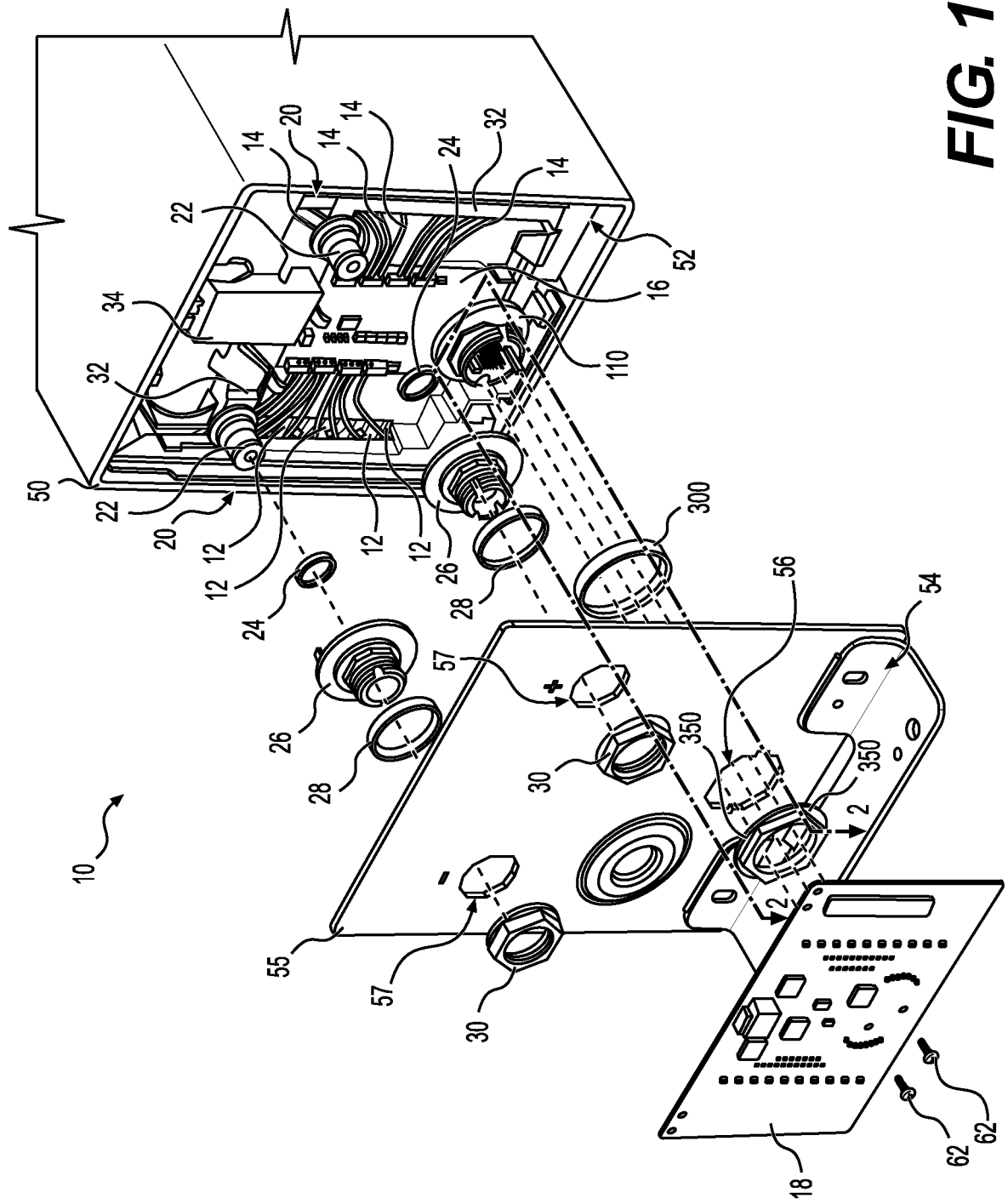
FIG. 1 is a front, top, left side partially exploded view of a front portion of a battery pack.

The present detailed description is intended to be a description of illustrative examples of the present technology.

The present technology relates to a pass-through connector 100 having a body 110, a gasket 300 and a nut 350. The pass-through connector 100, when connected to a hermetic casing 50, can permit gas flow in and out of the casing 50 or can hermetically seal the casing 50 while electrically connecting, through an electrical connector 130, an internal circuit board 16 to an external electronic circuit board 18 or any other electric or electronic components suitable for connection to the connector 130. The pass-through connector 100 will be described in association with a battery pack 10, but it is contemplated that the pass-through connector 100 could be used with other casings that require gas exchange and/or a hermetic seal.

Referring to FIG. 1, the battery pack 10 which includes the casing 50 and the pass-through connector 100 will be described. The casing 50 has an interior side 52 and an exterior side 54. On the interior side 52, the battery pack 10 has a plurality of cells 12. Each of the cells 12 has an anode and a cathode. The cells 12 are disposed inside the casing 50. More specifically, the cells 12 are stacked inside the casing 50. Cables 14 connect the cells 12 to the pass-through connector 100 through an internal circuit board 16.

The battery pack 10 also has two power posts 20. One of the power posts 20 has a positive electrical polarity, and the other power post 20 has a negative electrical polarity. Each of the power posts 20 has a conductor 22, an inner gasket 24, a connecting portion 26, an outer gasket 28 and a nut 30. Each of the conductors 22 is connected to a busbar 32. The busbars 32 connect the cells 12 to the power posts 20. The busbar 32 of one of the power posts 20 is connected to a pyrotechnic device 34 that is adapted to, upon activation, break the busbar 32 to which it is connected. This safety feature interrupts current flowing through the battery pack 10 under certain conditions.

The casing 50 has a front cover 55. The front cover 55 is welded to a remainder of the casing 50, thereby forming a hermetic joint. The front cover 55 defines a generally octagonal casing aperture 56 and two octagonal casing apertures 57. It is contemplated that the casing apertures 56, 57 could have another shape such as a pentagon or a hexagon. The casing aperture 56 receives the pass-through connector 100 therethrough as will be described in more detail below. Each of the casing apertures 57 receives one of the power posts 20 therethrough. On the exterior side 54, the nut 350 connects to the body 110 of the pass-through connector 100, and the nuts 30 connect to the connecting portions 26 of the power posts 20 extending through the casing apertures 57.

Figure 2:
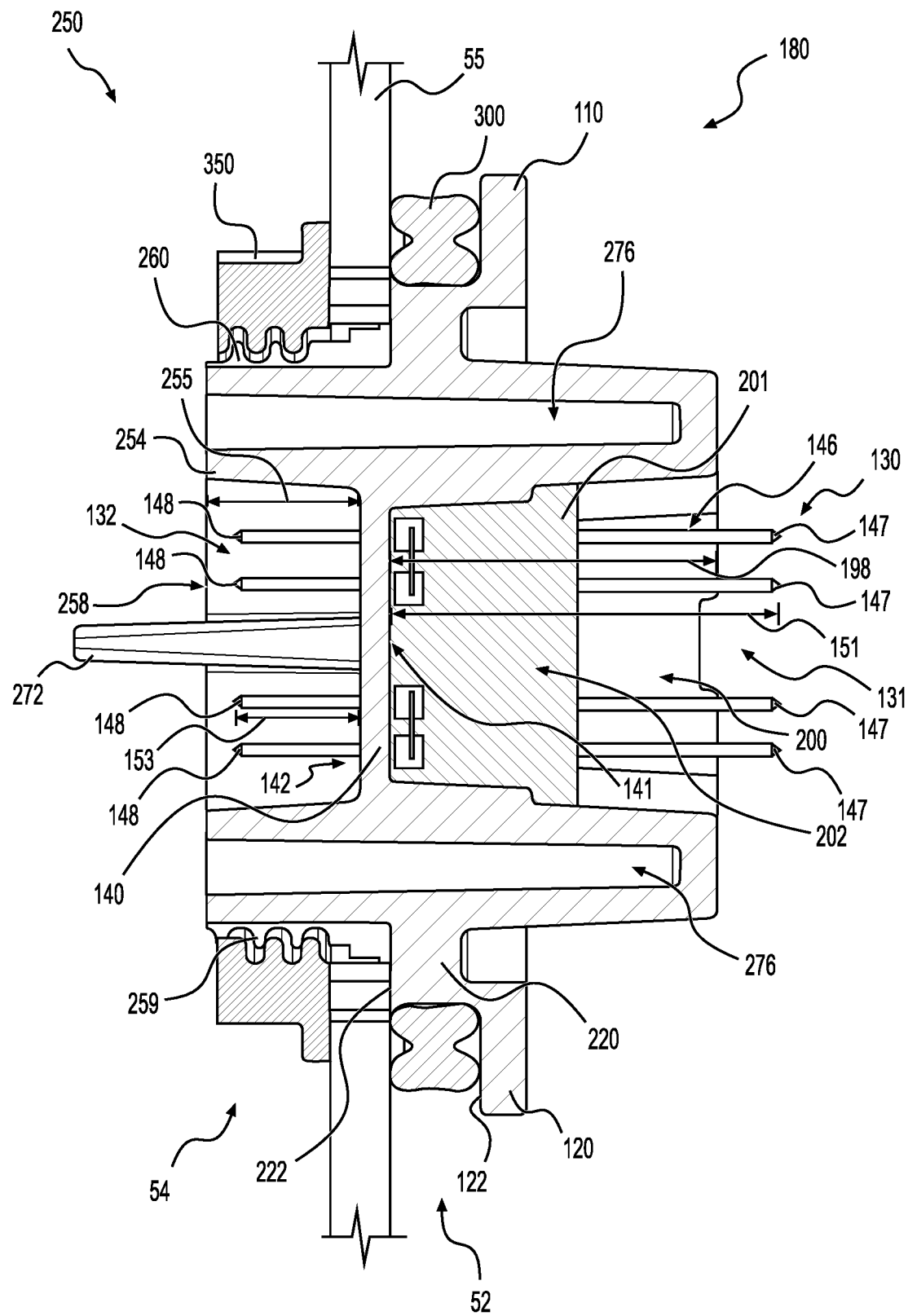
FIG. 2 is a cross-sectional view of a pass-through connector of the battery pack of FIG. 1 taken through line 2-2 of FIG. 1.
Figure 3:
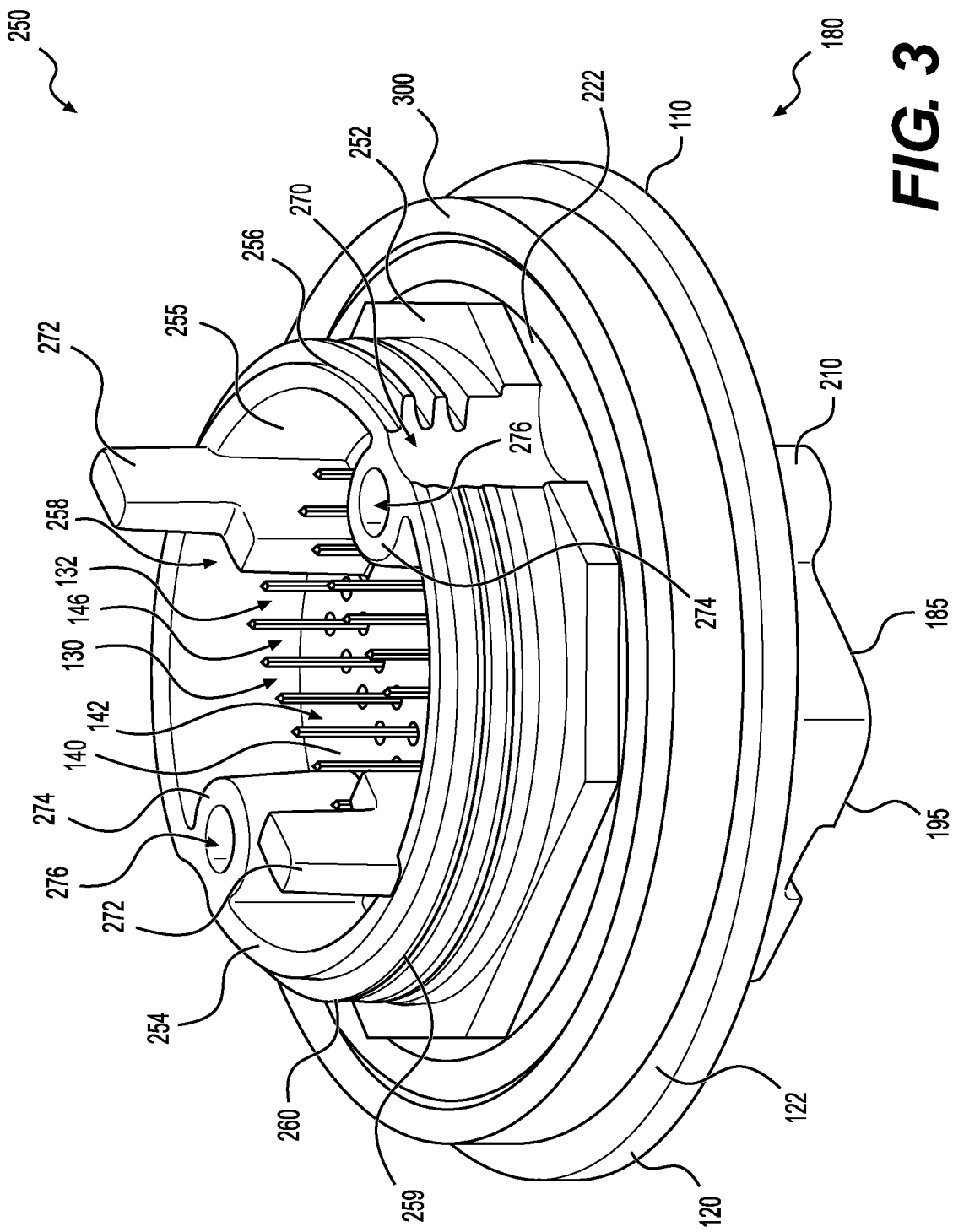
FIG. 3 is a perspective view taken from a bottom, front, left side of a body, connector pins, and a gasket of the pass-through connector of FIG. 2.
Figure 4:
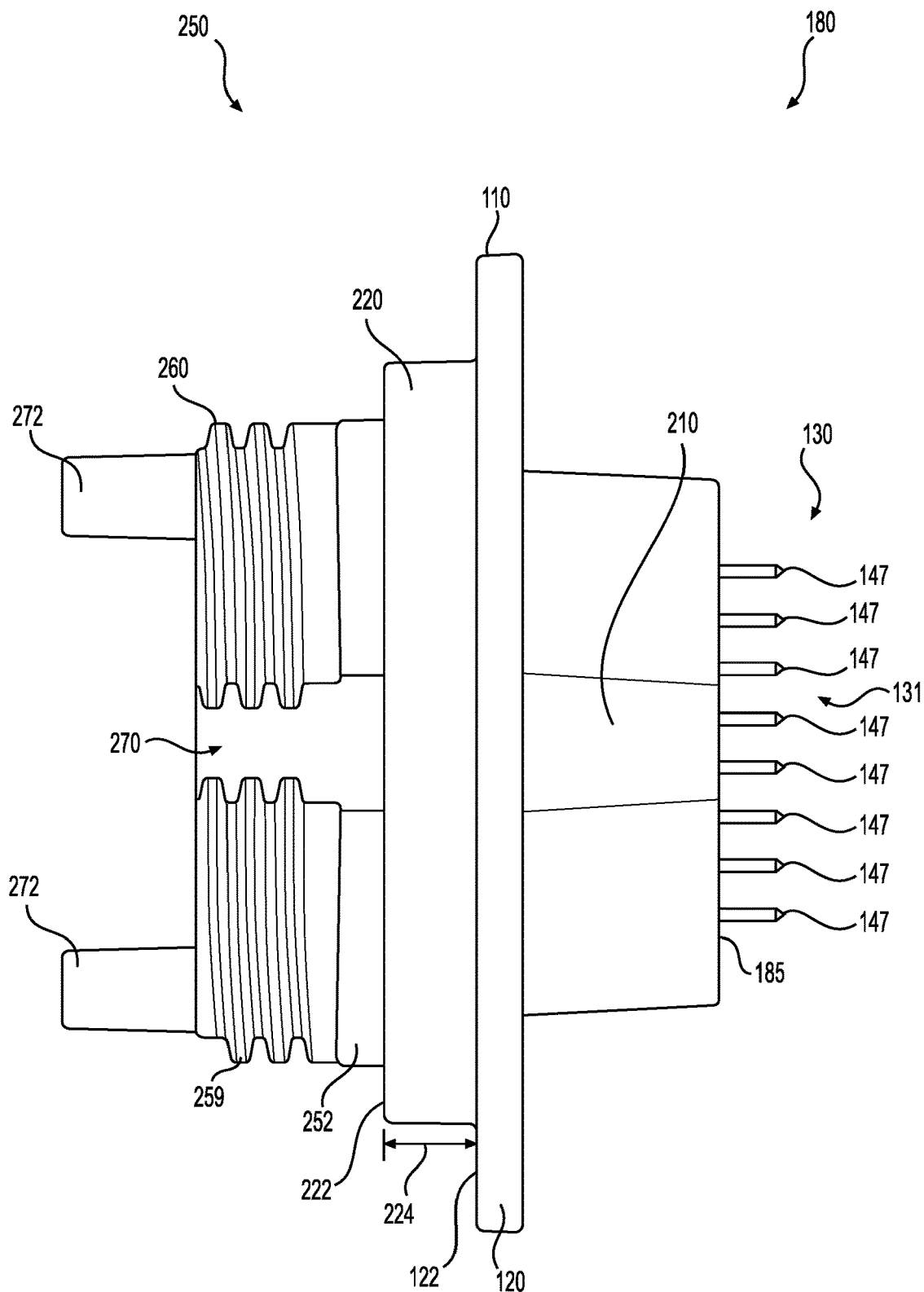
FIG. 4 is a left side elevation view of the body and connector pins of FIG. 3.
Figure 5:
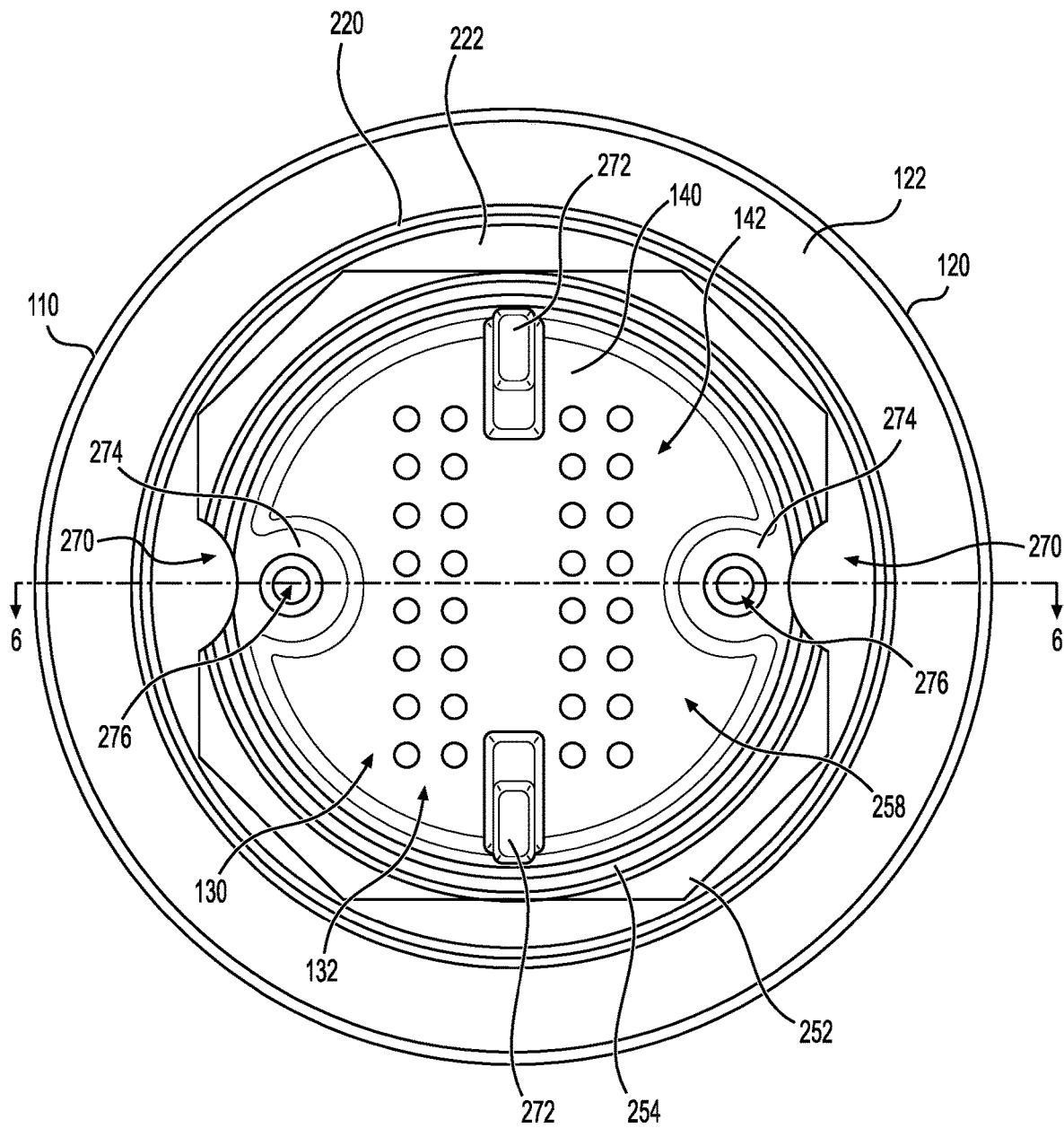
FIG. 5 is a front elevation view of the body and connector pins of FIG. 3.

Referring to FIGS. 2 and 3, the pass-through connector 100 will be described in more detail. As mentioned above, the pass-through connector 100 has the body 110, the gasket 300 and the nut 350. The pass-through connector 100 is adapted to be received into the casing aperture 56 of the casing 50. The body 110 has a body portion 180 and a body portion 250 opposite the body portion 180. When the pass-through connector 100 is installed on the casing 50, features of the body portion 180 are on the interior side 52 of the casing 50, and features of the body portion 250 are on the exterior side 54 of the casing 50. The body portion 250 defines a connector portion 260 to which the nut 350 can selectively be connected, as will be described below. Two axially extending recesses 270 (best seen in FIGS. 3, 7 and 8) are defined in the body portion 250. As will be explained in greater detail below, the recesses 270 permit gas exchange in and out of the casing 50 when the nut 350 is not tightly connected to the connector portion 260. The body 110 also has a flange 120 that is connected to and projects radially from the body portion 180. The gasket 300 is inside the casing 50, and abuts both the flange 120 and the front cover 55. When the nut 350 is tightly connected to the connector portion 260, the gasket 300 is resiliently compressed between the flange 120 and the front cover 55, which causes the gasket 300 to provide a hermetic seal between the pass-through connector 100 and a portion of an inner side of the front cover 55 that surrounds the casing aperture 56. The battery pack 10 has an inert gas mixture sealed in the casing 50. The inert gas mixture prevents oxidation of the cells 12 and/or of the other components within the battery pack 10. Having a hermetic seal prevents the inert gas mixture from leaving the casing 50, and prevents other gases from entering the casing 50.

The body 110, the gasket 300 and the nut 350 are made of electrically insulating materials. It is contemplated that in some embodiments, one or more of the body 110, the gasket 300 and the nut 350 could not be made of an electrically insulating material. In the present embodiment, the body 110 is formed of injection molded polymeric material. However, it is contemplated that the body 110 could be formed in other ways such as casting or 3D printing. The pass-through connector 100 and its various components will be described in more detail below.

Referring to FIGS. 4 to 9, the body 110 of the pass-through connector 100 will be described in greater detail. The body 110 has the hermetic electrical connector 130, the body portion 180 and the body portion 250.

Figure 6:
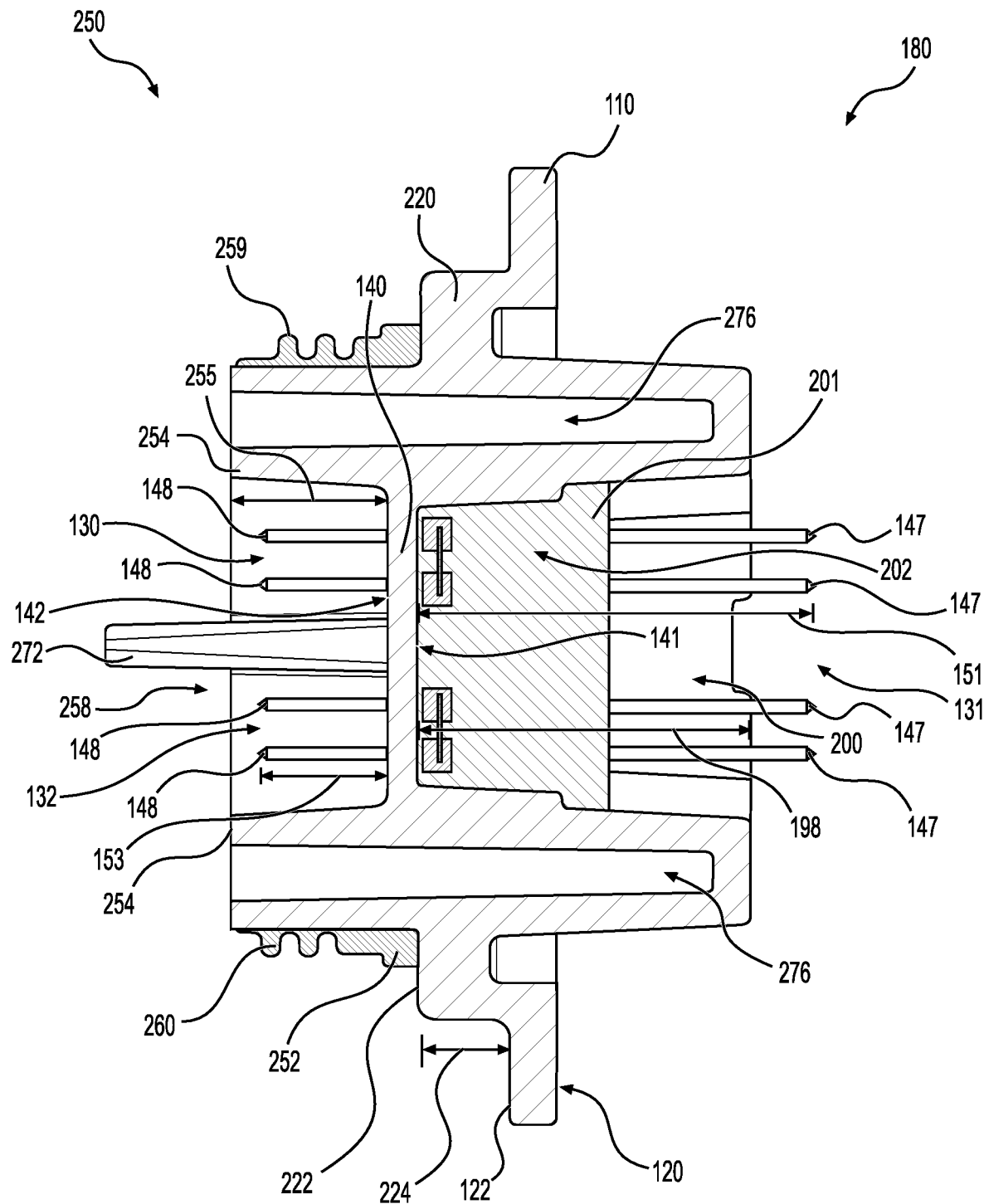
FIG. 6 is a cross-sectional view of the body and connector pins of FIG. 3 taken through line 6-6 of FIG. 5.

The electrical connector 130 has a side 131 and a side 132 (best seen in FIG. 6). The electrical connector 130 has a partition wall 140 that is connected to the body 110. The partition wall 140 has a partition side 141 and a partition side 142. The partition side 141 is on the same side as the body portion 180 and the side 131, and the partition side 142 is on the same side as the body portion 250 and the side 132. The partition wall 140 defines thirty-two through holes 145. The electrical connector 130 also has thirty-two connector pins 146 inserted through the through holes 145. Each of the connector pins 146 has a free end 147 and a free end 148, located respectively on the side 131 and the side 132. When assembled, the connector pins 146 project away from the partition sides 141, 142. It is contemplated that the number of connector pins 146 and the number of through holes 145 could change if another type of electrical connector 130 were to be used. In the present embodiment, the pass-through connector 100 provides two male connectors (i.e. the pins 146 extending on each side of the partition wall 140). It is contemplated that in other embodiments, the pass-through connector 100 could provide two female connectors or one male connector and one female connector. The electrical connector 130, and how it connects to the body 110, will be described in greater detail below.

Figure 9:
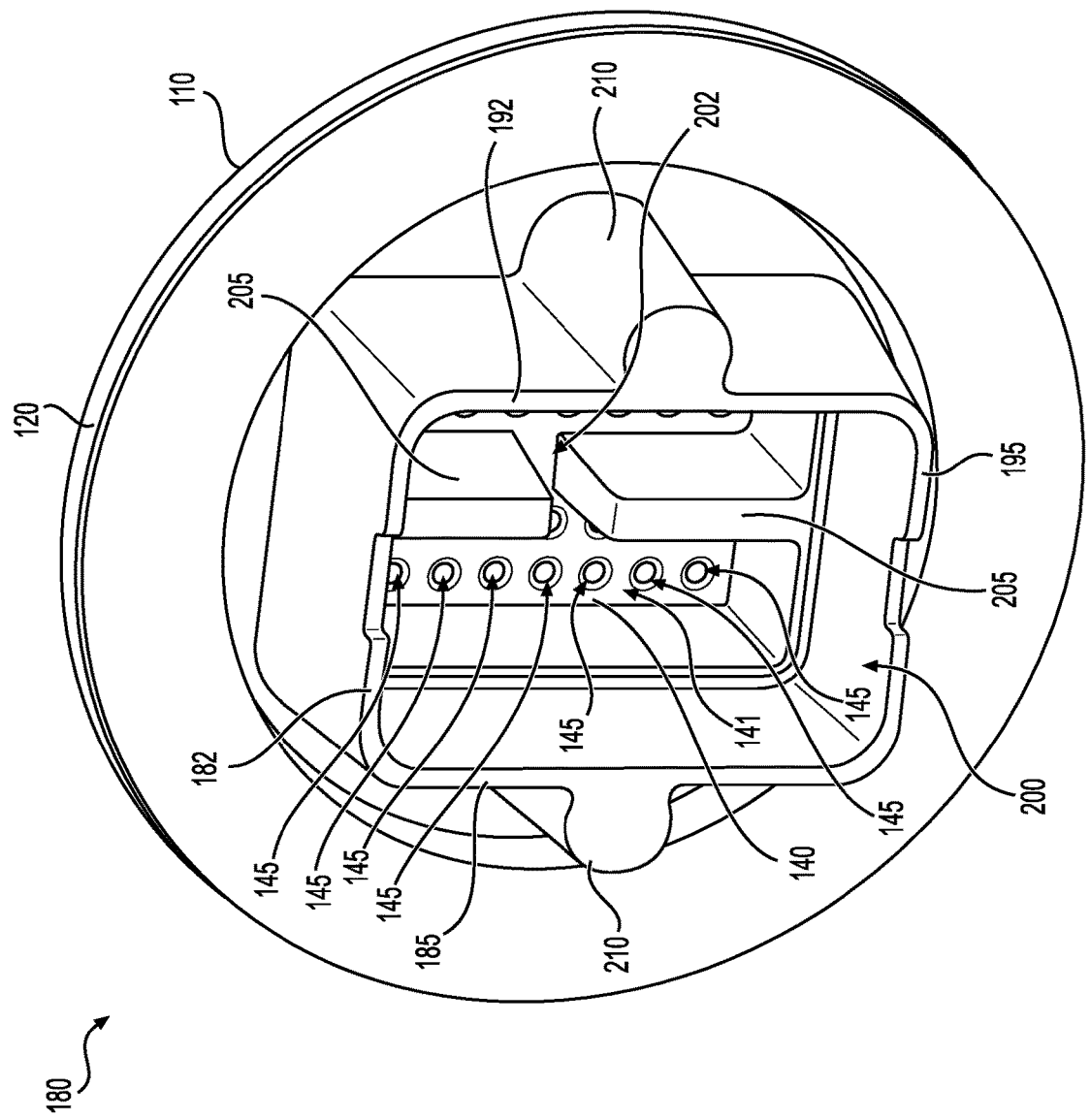
FIG. 9 is a perspective view taken from a top, rear, right side of the body of FIG. 8.

As best seen in FIG. 9, in the present embodiment, the body portion 180 has an upper side wall 182, a left side wall 185, a right side wall 192 and a lower side wall 195 that, starting from the partition side 141, project away from the body portion 250. The walls 182, 185, 192, 195 project generally the same distance from the partition wall 140, and as such have a common side wall height 198 (FIG. 6), measured from the partition wall 140 to the rear ends of the walls 182, 185, 192, 195. The walls 182, 185, 192, 195 form a generally rectangular shape. It is contemplated that in other embodiments, there could be more or less walls that could form a circular shape, a pentagonal shape or another shape. The walls 182, 185, 192, 195 define a side cavity 200 on the same side as the partition side 141. The body portion 180 has two ribs 205 extending inside the side cavity 200 from the upper and lower side walls 182, 195 adjacent to the partition wall 140. A space is defined between the ends of the ribs 205. The side cavity 200 has an inner portion 202 that extends from the partition wall 140 to the rear sides of the ribs 205. There are sixteen through holes 145 on the left side of the ribs 205, and sixteen through holes 145 on the right side of the ribs 205.

The body portion 180 also has two circular projections 210 outside the cavity 200. One of the circular projections 210 is adjacent to an exterior wall surface of the left side wall 185, and the other circular projection 210 is adjacent to an exterior wall surface of the right side wall 192. The two circular projections 210, starting from the partition wall 140, extend axially away from the body portion 250. The circular projections 210 have a height measured from the partition wall 140 to their rear ends that is generally the same as the side wall height 198. It is contemplated that in some embodiments, there could be only one circular projection 210. In other embodiments, there could be three or more circular projections 210. It is also contemplated that the circular projections 210 could be omitted.

The flange 120 is connected to, and projects radially away from, the second body portion 180. The flange 120 has an annular shape. The flange 120 has an engagement surface 122 that engages the gasket 300. The mold used in the injection molding process is designed such that the engagement surface 122 is free of flash lines, thus improving the seal between the gasket 300 and the engagement surface 122.

In the present embodiment, the body portion 180 defines a shoulder 220. The shoulder 220 extends radially away from the body portion 180, while the flange 120, to which the shoulder 220 is connected, extends radially away from the shoulder 220. The shoulder 220 has a smaller diameter than the flange 120, but a larger diameter than the casing aperture 56. The shoulder 220 also has a shoulder surface 222 that, as will be described in greater detail below, abuts against the interior side 52 of the front cover 55 when the pass-through connector 100 is tightly connected to the casing 50. The shoulder 220 has a shoulder height 224 (FIG. 6). The shoulder height 224 is measured in the axial direction from the engagement surface 122 to the shoulder surface 222. As will be described in greater detail below, the shoulder height 224 could depend on the compressibility of the gasket 300.

Still referring to FIGS. 4 to 9, the body portion 250 has a radially extending polygonal flange 252. The polygonal flange 252 is connected to the shoulder 220. In the present embodiment, the polygonal flange 252 is an octagonal flange 252. It is contemplated that in other embodiments, the polygonal flange 252 could have another shape such as a pentagon or a hexagon. As will be described in more detail below, the polygonal flange 252 is received in the casing aperture 56.

The body portion 250 further has a side wall 254 that, starting from the partition wall 140, projects away from the body portion 180, and forms a circular shape. It is contemplated that in other embodiments, the side wall 254 could have another shape such as a rectangular shape, and therefore it is contemplated that there could be more than one side wall 254. The side wall 254 has a side wall height 255 (FIG. 6) that is measured from the partition wall 140 to the forward end of the side wall 254. The side wall 254 also has an interior wall surface 255 and an exterior wall surface 256. The side wall 254 defines a side cavity 258 that is on the same side as the partition side 142.

An external thread 259 is defined on the exterior wall surface 256. As will be explained in greater detail below, the side wall 254 and the external thread 259 together form the connector portion 260.

The two recesses 270 are axially defined on the exterior wall surface 256 and on the polygonal flange 252. Therefore, the two recesses 270 are axially defined along the whole body portion 250, including the external thread 259. It is contemplated that the recesses 270 could be defined in other ways. For instance, in some embodiments, there could be only one recess 270. In other embodiments, there could be three or more recesses 270.

The body portion 250 also has two guiding projections 272 located inside the side cavity 258. One of the guiding projections 272 is positioned on an upper side of the side cavity 258, and the other guiding projection 272 is positioned on a lower side of the side cavity 258. The two guiding projections 272, starting from the partition wall 140, extend axially away from the body portion 180 and are adjacent to the interior wall surface 255. The guiding projections 272 have a height that is greater than the side wall height 255, and therefore the guiding projections 172 project beyond the forward end of the side wall 254. It is contemplated that in some embodiments, there could be only one guiding projection 272. In other embodiments, there could be three or more guiding projections 272. It is also contemplated that the guiding projections 272 could be omitted.

The body portion 250 also has two circular projections 274 located inside the side cavity 258. One of the circular projections 274 is positioned on a left side of the side cavity 258, and the other circular projection 274 is positioned on a right side of the side cavity 258. The two circular projections 274, starting from the partition wall 140, extend axially away from the body portion 180 and are adjacent to the interior wall surface 255. The circular projections 274 have a projection height that is equal to the side wall height 255, and therefore the circular projections 274 are flush with the forward end of the side wall 254. The circular projections 274 are concentric with the circular projections 210. It is contemplated that in some embodiments, there could be only one circular projection 274. In other embodiments, there could be three or more circular projections 274. It is also contemplated that the circular projections 274 could be omitted.

Each of the two circular projections 274 defines a tapering bore hole 276. It is contemplated that in embodiments where the number of circular projections 274 is different, the number of bore holes 276 would change accordingly. It is also contemplated that in embodiments where the circular projections 274 are omitted, the bore holes 276 could be defined elsewhere on the body 110, such as in the side wall 254. The bore holes 276 are defined to extend from a top of the circular projections 274, past the partition wall 140 and into the circular projections 210. As will be described below, the bore holes 276 are adapted for receiving threaded fasteners 62.

Figure 7:
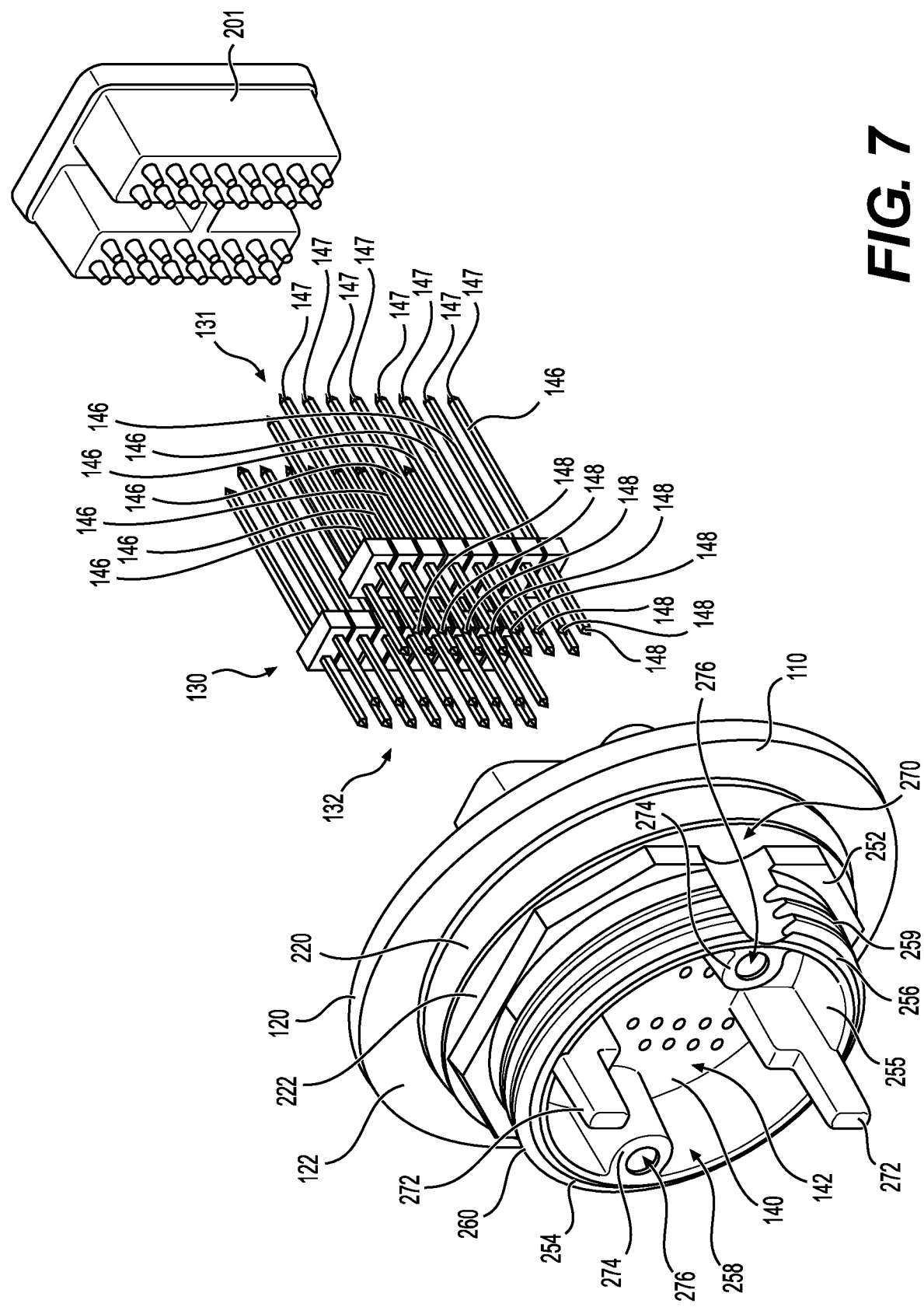
FIG. 7 is an exploded, perspective view taken from a top, front, left side of the body and connector pins of FIG. 3.
Figure 8:
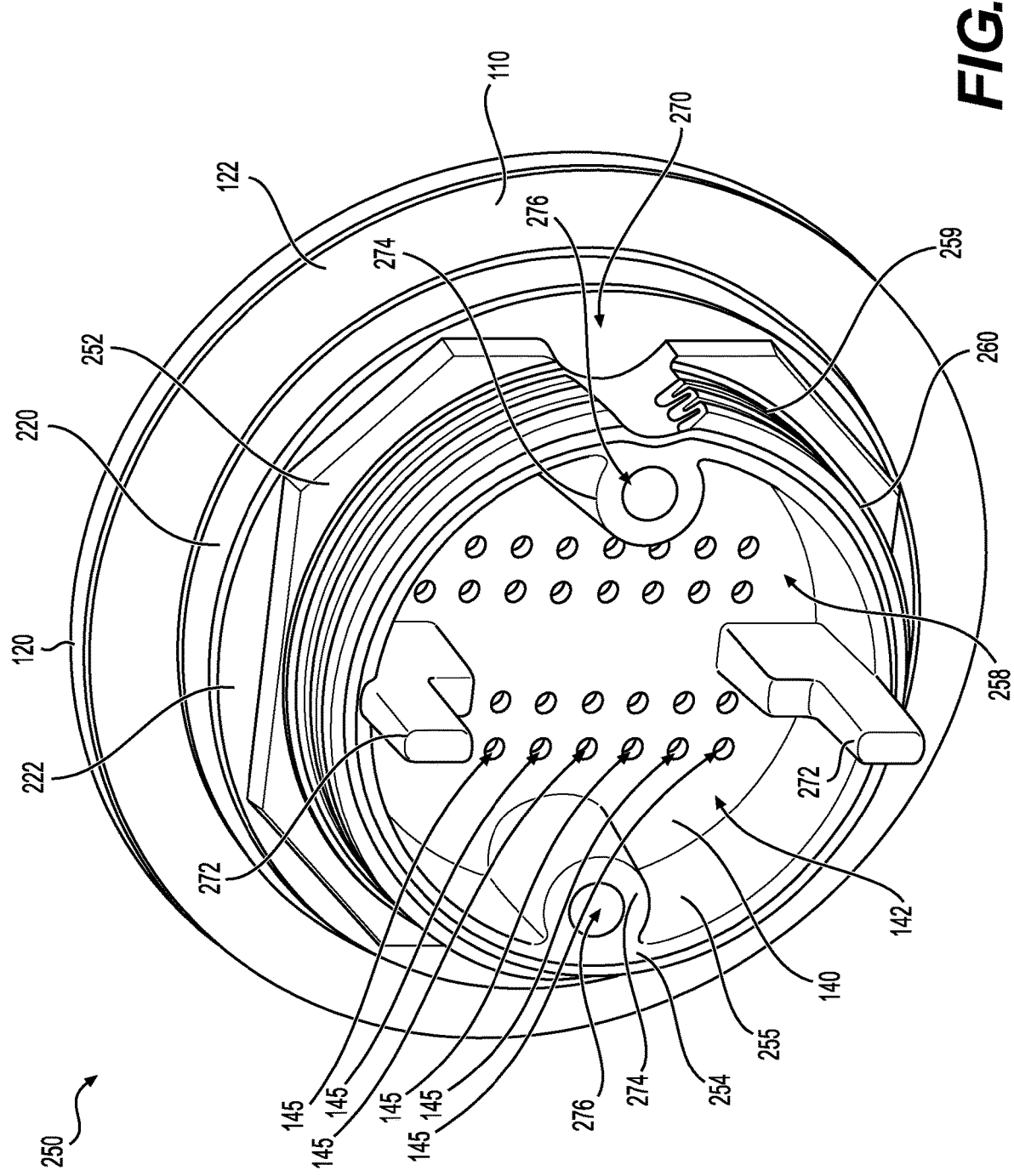
FIG. 8 is a perspective view taken from a top, front, left side of the body of FIG. 3.

Referring now to FIGS. 2, 6 and 7, the electrical connector 130 will be described in greater detail.

The portions of the connector pins 146 that extend through the side cavity 200 have a pin height 151 (FIG. 6) that is measured from the partition side 141 to their free ends 147. The pin height 151 of the connector pins 146 is greater than the side wall height 198 such that the connector pins 146 extend past the rear ends of the walls 189, 185, 192, 195 as can be seen FIGS. 2, 4 and 6.

The side cavity 200 is partially filled with epoxy 201 (best seen in FIG. 6). It is contemplated that in other embodiments, another filler could be used. The epoxy 201 completely fills the inner portion 202 of the cavity. The epoxy 201 bonds the connector pins 146 to the body 110 and also hermetically seals any space that exists between the connector pins 146 and their corresponding through holes 145.

The portions of the connector pins 146 that extend through the side cavity 258 have a pin height 153 (FIG. 6)

that is measured from the partition side 142 to their free ends 148. The pin height 153 of the connector pins 146 is smaller than the side wall height 255, such that the connector pins 146 do not extend past the forward end of the side wall 254.

Figure 10:
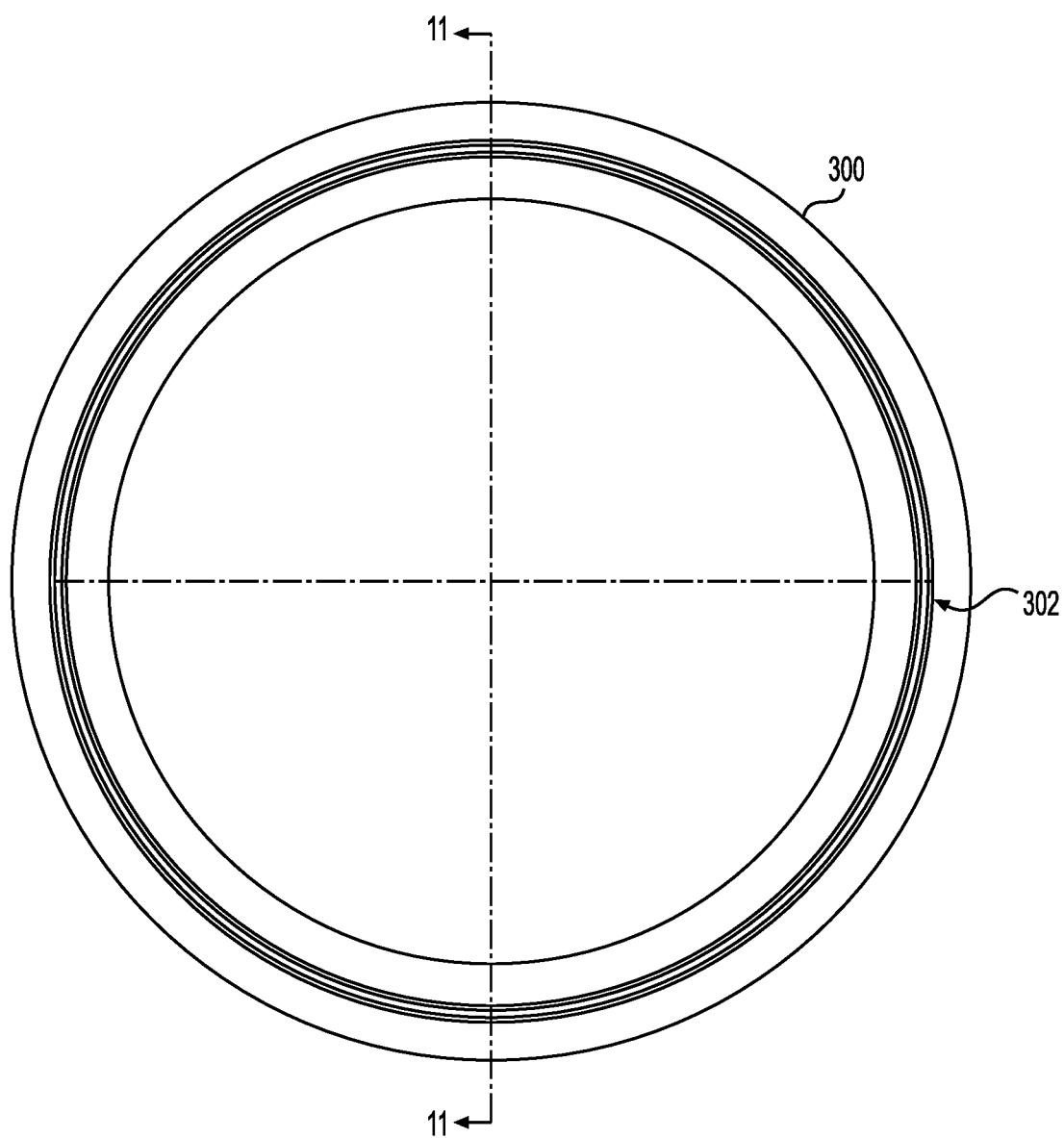
FIG. 10 is a front elevation view of the gasket of FIG. 3.
Figure 11:
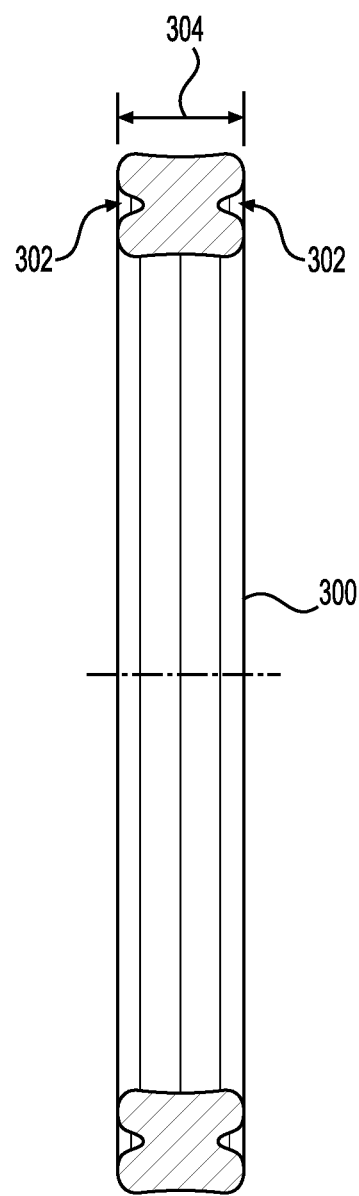
FIG. 11 is a cross-sectional view of the gasket of FIG. 10 taken through line 11-11 of FIG. 10.

Referring now to FIGS. 10 and 11, the gasket 300 will be described in greater detail. The gasket 300 is a X-ring seal 300 that has an uncompressed axial height 304. It is contemplated, however, that in some embodiments, another type of ring seal such as an O-ring seal or a square-ring seal could be used. The inner diameter of the X-ring seal 300 is large enough to surround both the shoulder 220 of the body 110 and the casing aperture 56 of the front cover 55. The outer diameter of the X-ring seal 300 is smaller than the outer diameter of the flange 252. Best seen in FIG. 11, the X-ring seal 300 has a cross-section resembling the shape of an X due to recesses 302 defined on both sides of the gasket 300, between the inner and outer diameters.

Figure 12:
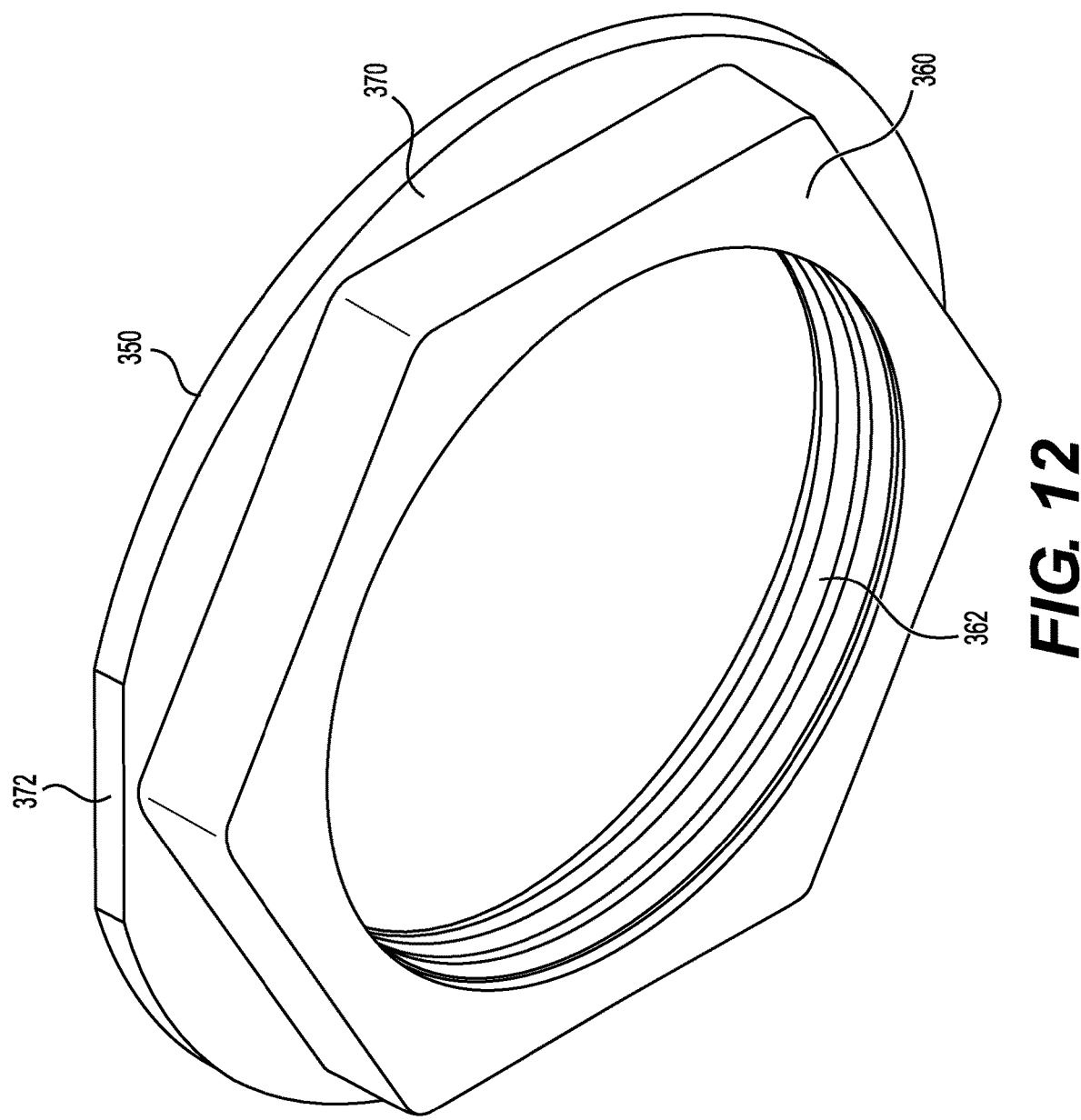
FIG. 12 is a perspective view taken from a top, front, left side of a nut of the pass-through connector of FIG. 2.
Figure 13:
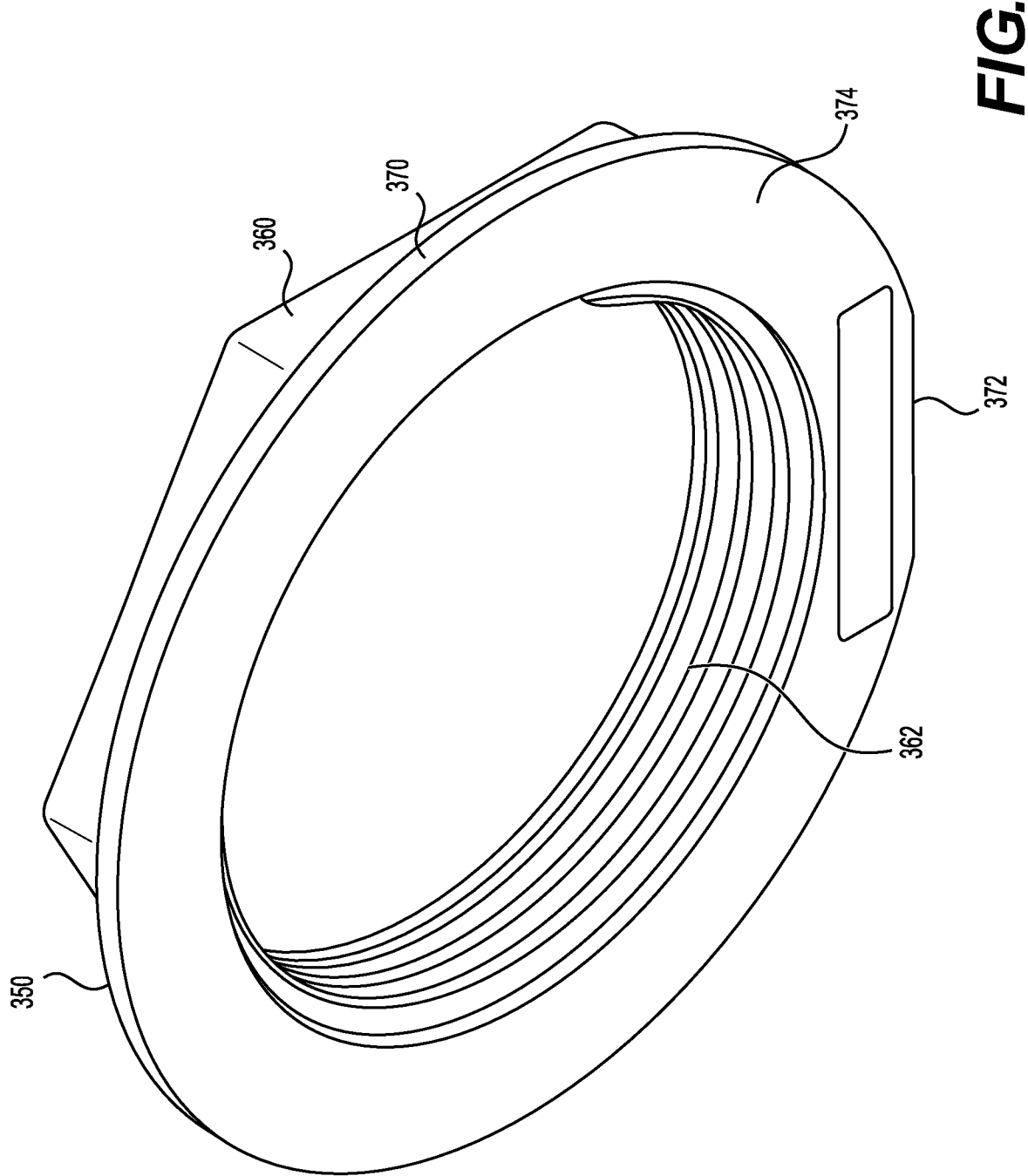
FIG. 13 is a perspective view taken from a bottom, rear, left side of the nut of FIG. 12.

Referring now to FIGS. 12 and 13, the nut 350 will be described in greater detail. In the present embodiment, the nut 350 is a connector portion 350 that is selectively connected to the connector portion 260. The nut 350 has a body 360 and a flange 370. The body 360 has a hexagonal shape, and defines an internal thread 362. As will be explained in greater detail below, the internal thread 362 is complementary to the external thread 259. The flange 370 extends radially away from the body 360, and has a circular contour with a flat edge 372. The flange 370 also has a rear casing engaging surface 374.

Referring to FIG. 2, the connection of the pass-through connector 100 to the casing 50 will now be described. The cells 12 are connected to the internal circuit board 16, which is connected to the electrical connector 130, which is connected to the body 110.

The gasket 300 surrounds the shoulder 220 and engages the engagements surface 122 of the flange 120. The gasket 300 is disposed between the front cover 55 and the flange 120.

The body 110 is received in the casing aperture 56. More precisely, the polygonal flange 252 is received in the casing aperture 56. Given that the polygonal flange 252 and the casing aperture 56 both have corresponding octagonal shapes, once the polygonal flange 252 is received into the casing aperture 56, the pass-through connector 100 is rotationally fixed relative to the front cover 55. As mentioned above, it is contemplated that in other embodiments, the shape of the casing aperture 56 and the polygonal flange 252 could be different. It is also contemplated that this feature could be omitted.

The nut 350 is then connected to the connector portion 260 via their complementary internal and external threads 362, 259. It is contemplated that the way in which the connector portions 166, 350 connect to one another could be different from the screw down connection shown in the present embodiment. The connection could be, for instance, a circlip, a clevis pin or another type of connection. Tightening the nut 350 to the connector portion 260 resiliently compresses the gasket 300, which provides a hermetic seal. During initial assembly of the pass-through connector 100 to the casing 50, in the present scenario, the casing 50 is naturally filled with whatever gas mixture was present where the battery pack 10 is assembled, henceforth referred to as atmospheric gas mixture.

The external electronic circuit board 18 is then connected to the electrical connector 130 and to the body portion 250, thanks to the guiding projections 272 that are adapted to position the external electronic circuit board 18 so that it can electrically connect to the connector pins 146, and thanks to the threaded fasteners 62 that secure the external electronic circuit board 18 to the body portion 250 by fastening the threaded fasteners 62 in the bore holes 276. It is contemplated that in some embodiments the external electronic circuit board 18 could be connected to the pass-through connector 100 differently such as with an adhesive or via clips.

Figure 14:
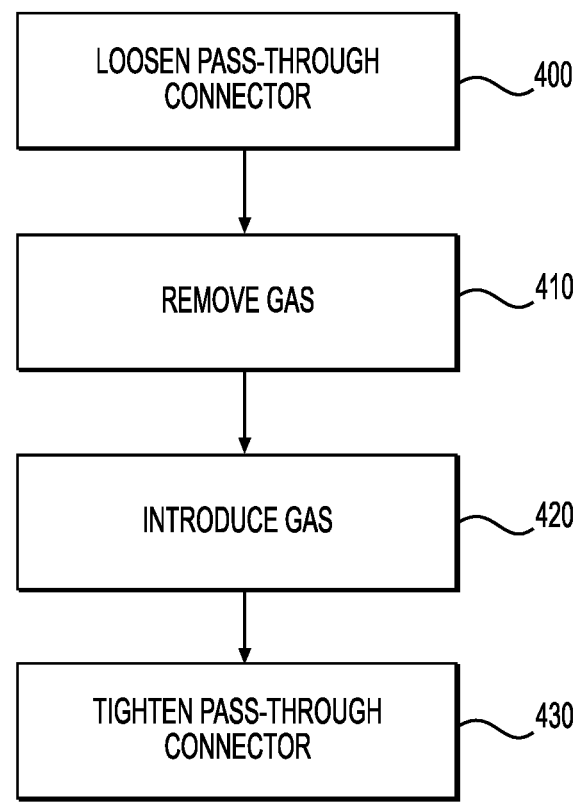
FIG. 14 is a diagram illustrating a method for introducing at least one gas in the casing for the battery pack of FIG. 1.

Referring now to FIG. 14, a method for introducing a gas in the casing 50 of the battery pack 10 that has the pass-through connector 100 will be explained. It is contemplated that the method may be carried out by an automatic controller, an operator or a combination of both.

The method begins at step 400, where the pass-through connector 100 is loosened. The pass-through connector 100 is loosened by unscrewing the nut 350 from the connector portion 260. When the nut 350 is unscrewed, a gas removal and delivery device (not shown) is disposed over and surrounds the pass-through connector 100 and the casing aperture 56 on the outside of the casing 50 such that gases can only exit or enter the casing 50 through the gas removal and delivery device. In some embodiments, the nut 350 could be unscrewed by the gas device. Once the nut 350 is unscrewed, the gasket 300 is no longer resiliently compressed, and therefore the pass-through connector 100 and the casing 50 are no longer hermetically sealed.

Then, at step 410, the atmospheric gas mixture inside the casing 50 is removed. The atmospheric gas mixture is removed from the casing 50 thanks to the gas removal and delivery device and the recesses 270. As the hermetic seal is no longer provided, the gas removal and delivery device is capable of removing the atmospheric gas mixture from inside the casing 50. The atmospheric gas mixture flows from the interior side 52 of the casing 50, past the gasket 300 and between the nut 350 and the body portion 250 through the recesses 270 to the exterior side 54 of the casing 50. Eventually, as all the atmospheric gas mixture in the casing 50 is removed, a vacuum forms within the casing 50.

Then, at step 420, a gas is introduced into the casing 50. The gas is introduced in the casing 50 through the gas removal and delivery device. In the present embodiment, the gas being introduced is helium, an inert gas. As explained above, an inert gas is introduced to prevent oxidation of the battery pack 10 and/or its components within the casing 50. It is contemplated that in other embodiments, another inert gas or an inert gas mixture could be introduced into the casing 50 instead of helium. In yet other embodiments, a non-inert gas could be introduced into the casing 50. Similarly to the step 410, helium is introduced in the casing 50 thanks to the gas removal and delivery device and the recesses 270. Helium being introduced flows through the recesses 270, past the gasket 300 and into the interior side 52 of the casing 50. In the present embodiment, helium is introduced inside the casing 50 until the helium pressure exceeds atmospheric pressure. It is contemplated that in some embodiments the helium pressure could be less than or equal to atmospheric pressure.

As explained, the recesses 270 permit the passage of gases in and out of the casing 50, when the pass-through connector 100 is loosely connected to the casing 50, because a passage is formed from the interior side 52 of the casing 50 to the exterior side 54. It is contemplated that in some embodiments, the recesses 270 could be defined on the nut 350 instead of the connector portion 260. In other embodiments, the recesses 270 could be defined on both the nut 350 and the connector portion 260.

Then, at step 430, the pass-through connector 100 is tightened. The pass-though connector 100 is tightened by screwing the nut 350 to the connector portion 260. In some embodiments, the nut 350 is screwed by the gas removal and delivery device. Screwing the nut 350 eventually results in the resilient compression of the gasket 300 and the engagement of the casing engaging surface 374 of the nut 350 to the exterior side 54 of the front cover 55. When the gasket 300 is sufficiently resiliently compressed, the gasket 300 provides the hermetic seal, and therefore seals the helium inside the casing 50. In the present embodiment, the gasket 300 is sufficiently compressed at least when the nut 350 is screwed such that the shoulder surface 222 abuts against the interior side 52 of the front cover 55. In the present embodiment, the shoulder height 224 of the pass-through connector 100 is 83% of the uncompressed axial height 304 of the gasket 300 such that the gasket 300 can be compressed up to 17% of its uncompressed axial height 304. In the other embodiments, the shoulder height 224 of the pass-through connector 100 could be greater than 83% of the uncompressed axial height 304 of the gasket 300 such that when the pass-through connector 100 is tightened, the gasket 300 resiliently compresses by less than 17% of its uncompressed axial height 304 before the shoulder surface 222 abuts against the interior side 52 of the front cover 55. This feature ensures that the gasket 300 is not overly compressed, and there is no unnecessary loads applied to the pass-through connector 100. It is contemplated that in some embodiments, the shoulder height 224 could be greater than 75% of the uncompressed axial height 304 of the gasket 300. In such embodiments, upon tightening, the gasket 300 would resiliently compress by less than 25% of its uncompressed axial height 304. It is also contemplated that in some embodiments, the shoulder 220 could be omitted. In such embodiments, the correct amount of compression of the gasket 300 could be determined by measuring the torque being applied to the nut 350 as it is being tightened. It is contemplated that in some embodiments, the gasket 350 could be resiliently compressed by 10 to 25% of its uncompressed axial height 304. In the present embodiment, resiliently compressing the X-ring seal 300 as described provides a sealing of helium of below $1\times10^{-6}$ atm-cc/s. Once the nut 350 is tightened, the gas removal and delivery device can be removed.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A pass-through connector for a battery pack, the battery pack having a hermetic casing, comprising:
 a body including:
  a hermetic electrical connector having first and second sides;
  a first body portion defining a first connector portion and being on a same side as the first side of the hermetic electrical connector;
  a second body portion opposite the first body portion and being on a same side as the second side of the hermetic electrical connector; and
  a flange connected to the second body portion and projecting radially away from the second body portion, the flange having an engagement surface;
 a second connector portion selectively connected to the body via the first connector portion, at least one of the first body portion and the second connector portion defining at least one recess for permitting gas exchange in and out of the casing; and
 a gasket abutting the engagement surface of the flange and adapted for providing a hermetic seal between the pass-through connector and the casing by connecting the second connector portion to the first connector portion to resiliently compress the gasket against the casing with the flange, the gasket being on a same side of the flange as the first body portion.

2. The pass-through connector of claim 1, wherein:
 the first connector portion has an external thread;
 the second connector portion has an internal thread complementary with the external thread; and
 the gasket abuts the engagement surface of the flange and hermetically seals the pass-through connector to the casing when the second connector portion is screwed down to the first connector portion and the gasket is resiliently compressed against the casing by the flange.

3. The pass-through connector of claim 1, wherein the hermetic electrical connector includes:
 a partition wall connected to the body and defining a plurality of through holes, the partition wall having a first side being on a same side as the first body portion, and a second side being on a same side as the second body portion, and
 a plurality of connector pins passing through the plurality of through holes and projecting away from the first and second sides of the partition wall.

4. The pass-through connector of claim 3, wherein:
 the first body portion has at least one first side wall projecting from the partition wall, the at least one first side wall defining a first cavity disposed on the first side of the partition wall, and
 the plurality of connector pins extends in the first cavity.

5. The pass-through connector of claim 4, wherein:
 the at least one first side wall has a first height; and
 each connector pin of the plurality of connector pins has a first pin height defined between a first free end of the connector pin disposed in the first cavity and on the first side of the partition wall, and the first height is greater than the first pin height.

6. The pass-through connector of claim 5, wherein:
 the second body portion has at least one second side wall projecting from the partition wall, the at least one second side wall defining a second cavity disposed on the second side of the partition wall, and
 the plurality of connector pins extends in the second cavity.

7. The pass-through connector of claim 6, wherein:
 the at least one second side wall has a second height; and
 each connector pin of the plurality of connector pins has a second pin height defined between a second free end opposite the first free end, the second free end being disposed in the second cavity and on the second side of the partition wall, and the second height is shorter than the second pin height.

8. The pass-through connector of claim 6, wherein the second cavity is at least partially filled with an adhesive for bonding the plurality of connector pins to the body and for hermetically sealing spaces between the plurality of connector pins and the plurality of through holes.

9. The pass-through connector of claim 1, wherein the body, the second connector portion and the gasket are made of electrically insulating materials.

10. The pass-through connector of claim 1, wherein the body is formed of injection molded polymeric material, and the flange is free of flash line on the engagement surface.

11. The pass-through connector of claim 1, wherein the gasket is a X-ring seal.

12. The pass-through connector of claim 1, wherein, when the second connector portion is connected to the first connector portion and the gasket hermetically seals the pass-through connector to the casing, the gasket is resiliently compressed by 10 to 25%.

13. The pass-through connector of claim 1, wherein:
the second body portion defines a radially extending shoulder having a shoulder surface for abutting the casing,
the flange extends radially from the shoulder, and
an axial distance between the engagement surface of the flange and the shoulder surface is more than 75% of an uncompressed axial dimension of the gasket.

14. The pass-through connector of claim 1, wherein the first body portion has a radially extending polygonal flange adapted for insertion in an aperture defined in the casing of the battery pack adapted to receive the pass-through connector.

15. The pass-through connector of claim 1, wherein the first body portion defines at least one bore hole adapted for receiving at least one threaded fastener.

16. The pass-through connector of claim 15, wherein the first body portion has at least one guiding projection extending away from the partition wall, the at least one guiding projection being adapted for positioning an electronic circuit board for operative connection with the plurality of connector pins, the electronic circuit board being adapted for connection by the at least one threaded fastener to the first body portion via the at least one bore hole.

17. The pass-through connector of claim 1, wherein the at least one of the first body portion and the second connector portion defining the at least one recess is the first body portion.

18. A battery pack comprising:
a casing;
at least one cell having an anode and a cathode, the at least one cell being disposed inside the casing;
the pass-through connector of claim 1 connected to and extending through the casing; and
at least one cable electrically connected between the at least one cell and the pass-through connector inside the casing.

19. A method for introducing at least one gas in a hermetically sealable casing for a battery pack, comprising:
loosening a pass-through connector fastened to the casing and extending through the casing, the pass-through connector having a gasket disposed between a flange of the pass-through connector and an inner surface of the casing, the gasket surrounding an aperture of the casing through which the pass-through connector is inserted, loosening the pass-through connector permitting a passage of gas between the gasket and the inner surface of the casing;
after loosening the pass-through connector, removing gas contained in the casing via a recess defined by the pass-through connector and disposed externally of the casing, the gas being removed flowing sequentially from the casing, past the gasket and through the recess;
after removing gas contained in the casing, introducing the at least one gas in the casing via the recess, the at least one gas being introduced flowing sequentially through the recess, past the gasket and into the casing; and
after introducing the at least one gas, tightening the pass-through connector to resiliently compress the gasket between the flange and the inner surface of the casing to form a hermetic seal preventing the passage of gas through the aperture in the casing and through the recess in the pass-through connector.

20. The method of claim 19, wherein the at least one gas is an inert gas.

* * * * *